Patented June 1, 1954

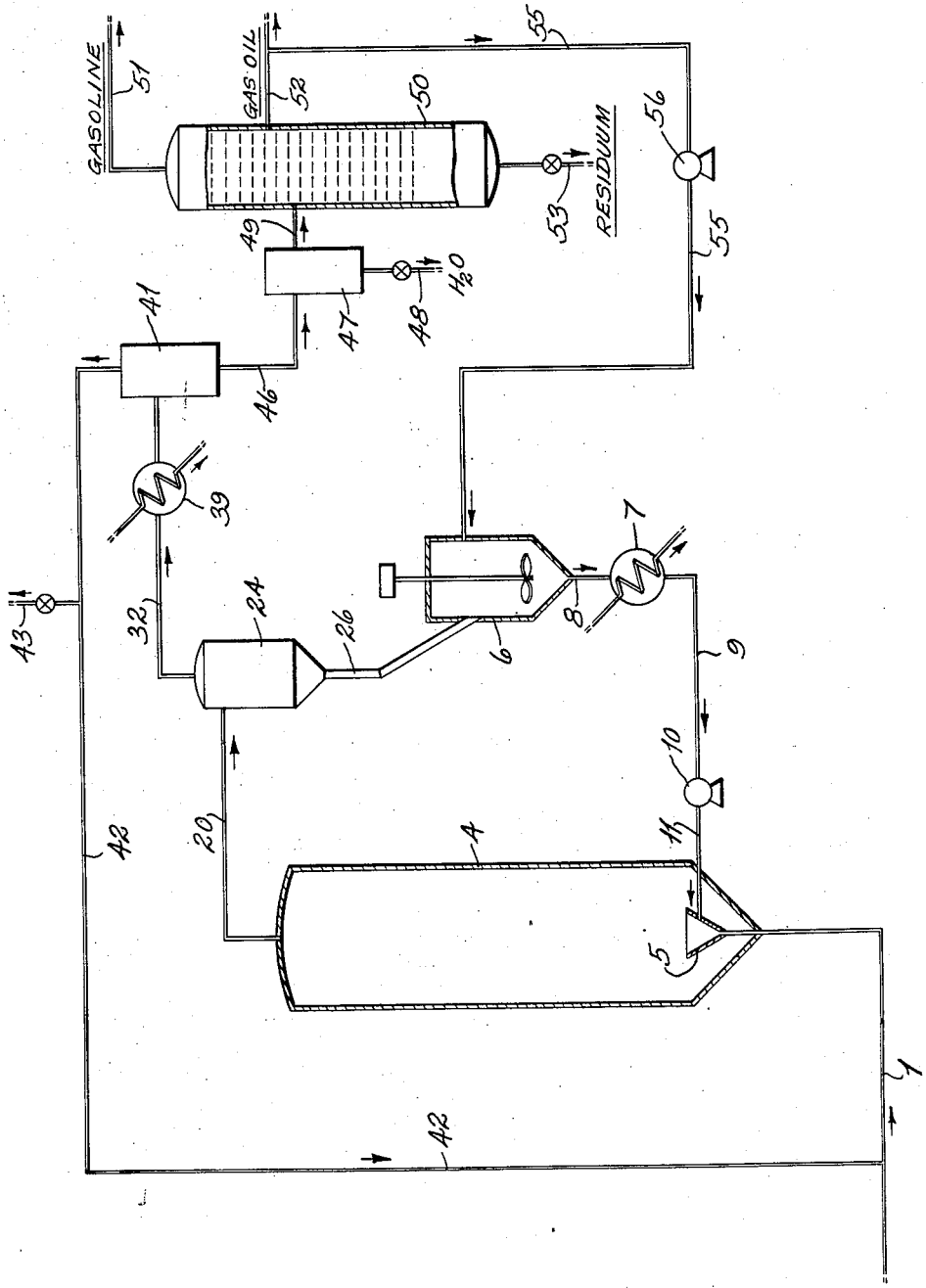

2,680,126

UNITED STATES PATENT OFFICE 2,680,126

METHOD OF EFFECTING THE HYDROGENATION OF CARBON MONOXIDE

Harold V. Atwell, Beacon, N. Y., assignor to The Texas Company, New York, N. Y., a corporation of Delaware Application October 27, 1950, Serial No. 192,387

9 Claims. (Cl. 260—449.6)

The present invention, which is a continuation-in-part of my copending application, Serial No. 681,912, filed July 8, 1946, now abandoned, relates to the exothermic conversion of gaseous reactants, and more particularly concerns the catalytic conversion of synthesis gas comprising hydrogen and carbon monoxide into hydrocarbons, oxygenated hydrocarbons and mixtures thereof.

This invention contemplates preparing a suspension of the finely divided catalyst in a liquid carrier; the suspension of catalyst in the liquid carrier is continuously introduced into a reaction zone as an atomized fog comprising the catalyst particles dispersed in the fog droplets of liquid carrier. The gaseous reactants are introduced into the reaction zone and passed therethrough intimately intermingled with the catalyst-containing fog droplets, and are thereby substantially converted into the desired products of reaction by contact with the dispersed particles in the reaction zone. While exothermic heat of reaction may, advantageously, be absorbed as latent heat of vaporization of the liquid carrier or of some additional liquid, not more than a portion of the liquid carrier is, in any event, permitted to vaporize in the reaction zone so that all of the finely divided catalyst particles remain as a suspension in the carrier liquid and are delivered to the outlet of the reaction zone in unvaporized liquid particles of fog.

In other words, the catalyst particles remain suspended in the fog droplets of carrier liquid throughout their residence in the reaction zone and are withdrawn from the reaction zone with the effluent gasiform products and thereafter separated from the gasiform products of reaction by simply coalescing the fog droplets.

Atomization of the suspension and liquid carrier is most advantageously effected by introducing the suspension of finely comminuted catalyst and liquid carrier into the reaction zone with a stream of gaseous reactants through an atomizing device such as a two-fluid nozzle. In this manner, the atomized fog of suspended catalyst and the gaseous reactants are intimately intermingled, and thereafter caused to flow concurrently through the reaction zone. The velocity at which the gaseous reactants are passed through the reaction zone is regulated so that the droplets containing finely comminuted catalyst particles remain entrained as a fog in the gas stream.

As above intimated, the fog droplets are discharged from the reaction zone together with the products of reaction. If a portion of the liquid carrier is vaporized in the reaction zone, then the amount of fog actually discharged will be correspondingly decreased. If no substantial vaporization takes place in the reaction zone, then the amount of fog discharged is substantially the same as that introduced. In any event, however, the catalyst particles remain suspended in the unvaporized fog droplets of carrier which are discharged from the reaction zone with the products of reaction.

The heat which is evolved during the catalytic conversion of the gaseous reactants may be partially absorbed as sensible heat of atomized particles. Since the atomized particles consist of finely divided catalyst particles disposed within and upon liquid droplets of carrier, the sensible heat capacity of both the catalyst particles and the liquid carrier may be utilized to absorb exothermic heat of reaction. Also, a portion of the temperature control may be provided as above intimated, by employing a liquid carrier which is partially vaporizable under the conditions of conversion, so that the heat of reaction is absorbed as the latent heat of the liquid carrier. Alternatively, the liquid carrier may be substantially unvaporizable under the conditions of reaction, and temperature control may be effected by simultaneously atomizing a separate stream of vaporizable liquid within the reaction zone, or by any other suitable temperature regulating means.

The suspension, consisting of catalyst particles in liquid carrier, may be introduced into the reaction zone at a temperature of 200–400° F. below reaction temperature. This allows the absorption of considerable heat as the sensible heat of the atomized droplets.

As above intimated, the present invention has particular application to the catalytic conversion of synthesis gas comprising hydrogen and carbon monoxide into hydrocarbons, oxygenated hydrocarbons and mixtures thereof. This reaction is strongly exothermic and requires very close temperature control in order to obtain the desired products.

The liquid carrier in which the catalyst is suspended is advantageously a conversion product. Other compounds which are inert under reaction conditions and which will not poison the catalyst may also be used. In the catalytic conversion of synthesis gas, a gas oil fraction may be employed as a liquid carrier. While it is permissible to use a gas oil fraction, a substantial portion of which will vaporize under the conditions of reaction to assist temperature control, nevertheless, it is to be noted that the fraction is such that a substantial portion remains unvaporized, so that all the finely divided catalyst particles remain suspended therein and are delivered to the reaction zone. More specifically, it is preferred that a major portion, at least, of the carrier liquid remain unvaporized.

The selection of the specific gas oil fraction as a liquid carrier depends upon the particular catalyst and the reaction conditions which are chosen for the catalyst conversion. For example, if a finely divided, unsupported iron-type catalyst is used, a gas oil fraction boiling in the range of about 550–650° F. may be employed; whereas, if a cobalt catalyst is employed, a gas oil fraction boiling in the range of about 400–500° F. may be employed. In either event, however, higher end point gas oils up to about 750° F. are suitable, particularly where very restricted vaporization is desired. The extent to which the fog particles of carrier liquid which vaporizes during passage is controlled in accordance with well-known physical principles which, per se, form no part of the present invention, but which depend upon the vapor pressure of the carrier liquid, the partial pressure of equivalent vaporform products in the reaction zone, the extent of volume contraction caused by the reaction, the extent to which the vapor equilibrium is approached during the limited contact time prevailing and the relative rate at which the atomized fog is fed through the reaction zone. In view, however, of the impracticability of determining in advance the effect of these complex variables, the appropriate rate of addition and the character of the carrier liquid comprising the fog droplets, is best determined by trial, such that a substantial portion thereof, sufficient to entrain all of the catalyst particles in suspension therein, remains unvaporized and is withdrawn from the reaction zone.

As previously stated, the gaseous reactants and atomized droplets containing the catalyst particles flow concurrently through the reaction zone in the preferred modification of the invention. By correlation with the density and particle size of the atomized droplets with the velocity of the gaseous reactants, the atomized catalyst-containing droplets remain substantially entrained in the gas stream flowing from the reactor. The effluent leaving the reaction zone comprises products of reaction containing the entrained fog of unvaporized liquid carrier containing the suspended catalyst particles and may, as above indicated, include a vaporized portion of the carrier.

Coalescence of the fog droplets to effect separation of the catalyst from the gaseous constituents of the effluent may be carried out with any of a large number of separating means. Effective coalescence takes place in conventional separating means, such as cyclone separators, electrical precipitators, mechanical devices and the like, since the agglomeration of the atomized liquid particles which is provided therein, inherently results in the formation of larger liquid masses which separate readily and completely from the accompanying gas phase. In place of the separating devices mentioned above, coalescence of fog droplets may be advantageously effected by scrubbing the effluent product gas with a suitable liquid, such, for example, as a scrubbing liquid immiscible with the carrier liquid or else, with a portion of the recovered carrier liquid itself.

Water or a water solution of glycol may provide the immiscible scrubbing phase where the carrier comprises an oil fraction, for example. In such case, the liquids from the scrubbing step are separated by decantation, the scrubbing phase preferably being returned continuously to the scrubbing zone, while the recovered oil phase, containing the suspended catalyst, is cycled to the atomizer supplying fog to the reaction zone.

Where scrubbing is effected with recovered carrier liquid, a portion of the thus coalesced suspension discharged by the scrubber is continuously recycled to the scrubber to effect the coalescence of additional fog droplets, the remainder being returned to the atomizer as before.

In the event that scrubbing is effected at a temperature which results in any substantial product condensation, the condensed product is advantageously recovered from the liquids discharged by the scrubber. For example, where the fog carrier liquid is an oil fraction miscible with the liquid phase, any desired portion of the condensed product may be recovered by fractionation of the coalesced liquid from the scrubber, prior to returning the residual catalyst suspension to the atomizer. The gasiform constituents of the effluent from which the catalyst containing particles have been separated are subjected, in any event, to condensation and separation into various fractions through conventional means. The products can be separated into a normally gaseous fraction, a gasoline fraction, a gas oil fraction, a fuel oil fraction, and a heavy waxy residuum. The normally gaseous fractions are recycled, at least in part, to the reaction zone.

Means are provided to adjust the temperature of the suspension of catalyst in liquid carrier to any desired temperature prior to its reintroduction into the reaction zone in an atomized state.

The catalyst should be ground so that substantially all of it will pass through a 200-mesh screen and 20 to 40 percent will pass through a 400-mesh screen. The particle diameter should lie in the range of 5 to 200 microns.

The stream of reactants may enter the reaction zone at a space velocity of 500 to 2,000, space velocity being defined as volume of gas per reactor volume per hour. Preferably, a space velocity of 1,000 to 1,500 is employed.

The present invention is of particular advantage from the standpoint of the intimate contact between the reactants and catalyst particles. This is believed due in large part to the tendency of the catalyst particles to concentrate at the liquid-gas interface. In any event, however, the extensive contact area afforded by the minute fog droplets is in striking contrast to that resulting from prior proposals, the bubbling of reactant gases upwardly through a suspension of catalyst in a continuous phase of carrier liquid.

Of particular advantage, however, is the effective and complete separation of catalyst from the effluent products of reaction which is realized simply by coalescing the liquid carrier. In comparison, the complete separation of finely divided dry solid particles from a moving stream of gas is difficult and objectionable from the standpoint of cost involved. Manifestly, the present inventor eliminates these problems in yielding a product free of catalyst.

In order that the invention may be more fully understood and aptly described, reference will now be made to the accompanying drawing in which an adaptation of the method of the invention to catalytic conversion of carbon monoxide and hydrogen into desired products is presented.

Synthesis gas containing carbon monoxide and hydrogen in a molecular ratio which may vary from about 1:1 to about 1:4, but which is usually about 1:2, is obtained from a source, not shown, through pipe 1. Various well-known means of synthesis gas preparation may be employed, such as the water gas reaction or the oxidation of methane with a limited amount of oxygen.

The synthesis gas may be at atmospheric pressure, as it is introduced into a reactor 4 through the pipe 1 or the synthesis gas may be delivered to the reactor at superatmospheric pressures which may range up to 1500 pounds per square inch. The conversion of synthesis gas to liquid hydrocarbons in the gasoline range is advantageously carried out at a pressure of about 250 to 300 pounds per square inch.

A recycle stream containing normally gaseous products of a catalytic conversion such as carbon dioxide, hydrocarbon gases and unreacted carbon monoxide and hydrogen is combined with the fresh feed of synthesis gas in the pipe 1 prior to its introduction into the reactor 4. The source of this recycle stream will be described in detail later.

During the initiation of the catalytic conversion, the synthesis gas may be heated to desired reaction temperature prior to its introduction into the reactor 4. This may be accomplished in a preheater which is not shown in the drawing. Once the reaction is under way and the unit is in full operation, preheating of the synthesis gas may be eliminated and the synthesis gas may be introduced into the reactor at atmospheric temperature.

The pipe 1 connects with a distributor 5 within the reactor 4. The distributor 5 is adapted to the introduction of two fluids in the reactor 4. The distributor 5 may be designed on the principle of a two-fluid nozzle or other well-known device by which a gas is employed to aid in the atomization of a liquid.

A vessel 6 serves as storage tank for suspension of catalyst in liquid carrier. In the description of this invention, an iron catalyst will be employed to effect the catalytic conversion of synthesis gas. More specifically, the invention will be described using an unsupported iron catalyst containing 93 to 97 per cent iron, 3 to 7 per cent alumina and 0.2 to 2 per cent alkali metal oxides such as potassium oxide. It is understood, however, that other catalysts such as supported iron catalysts and supported or unsupported cobalt and nickel catalyst may be employed to effect the desired conversion.

The catalyst of the type described is comminuted to a finely divided state and then introduced into the vessel 6 where a suspension of the catalyst in liquid carrier is maintained by vigorous agitation. Catalyst should be ground so that the particle diameters lie within the range of 5 to 200 microns.

The most favorable reaction temperature with an iron catalyst of the above description lies between about 550–650° F. As above indicated, a gas oil fraction provides a good liquid carrier. A portion of the carrier may vaporize within the reaction zone, provided, however, that sufficient portion remains unvaporized to retain and deliver all of the catalyst particles in suspension therein to the outlet of the reaction zone. It should be noted that other liquids which are inert under the prescribed reaction conditions may also be employed as liquid carriers.

A pipe 8 connects the storage vessel 6 with a line 9 which leads to the distributor 5. A heat exchanger 7 is inserted in the pipe 8 whereby the suspension may be brought to any desired temperature prior to its introduction into the reactor 4. Suspension of catalyst in liquid carrier flows from the vessel 6 through the pipe 8 to the line 9 which leads to a pump 10. The pump 10 is used to deliver suspension of catalyst particles in liquid carrier to the distributor 5 through a pipe 11 at an elevated pressure.

Atomization of the catalyst-containing suspension is favored by two factors, namely sudden release of pressurized suspension through a plurality of fine jets in the distributor 5 into the free space of the reactor 4 and the velocity at which the gaseous reactants enter the reactor 4 through the distributor 5 which is arranged in the form of a suitable device for effecting atomization, such as a two-fluid nozzle.

The velocity at which synthesis gas and recycle gas enter the reactor is correlated with the density and size of the droplets so that the particles become entrained in the gas stream passing through the reactor 4. A space velocity of about 1,000 to 1,500 has proven useful in effecting such entrainment; depending upon the density and droplet size of the atomized fog, space velocities varying between 500 and 2,000 may be employed.

Synthesis gas is converted into hydrocarbons by contact with iron catalyst during the passage of catalyst and reactants through the reactor. The conversion of synthesis gas into hydrocarbons liberates a large quantity of heat.

As above indicated, exothermic heat of reaction may be continuously absorbed as retained heat of a portion of the liquid carrier. However, temperature regulation may be effected by internal cooling surfaces in the reactor or by any of the other means above mentioned.

The exothermic heat of reaction is partially absorbed as the sensible heat of the atomized liquid-enclosed catalyst particles. The suspension of catalyst in liquid carrier is delivered to the distributor 5 at a temperature substantially below reaction temperature. In this case wherein an iron catalyst is used, the suspension of catalyst and gas oil is delivered to the distributor 5 at a temperature of about 150° to 400° F.

A further portion of the exothermic heat of reaction is absorbed in heating the stream of gaseous reactants up to reaction temperature since synthesis gas is introduced into the reactor 4 at a temperature substantially below conversion temperature once the reaction is initiated.

Ninety per cent or better conversion is effected An effluent, comprising usually a small amount by passage of the reactants through the reactor 4.

An effluent, comprising usually a small amount of unreacted carbon monoxide and hydrogen, the gasiform products of reaction, the catalyst particles suspended in the entrained fog of unvaporized liquid carrier fog, and some vaporized liquid carrier, leaves the reactor 4 through conduit 20.

The effluent passes into a vessel 24, in which the catalyst particles are separated from the gaseous or vaporous constituents of the effluent by coalescence of the carrier droplets in which they were suspended. The means used to effect this separation are conventional. A series of cyclone separators efficiently accomplishes the separation. The separated catalyst particles in the unvaporized carrier liquid flow through conduit 26 into the vessel 6, in which additional catalyst particles and additional liquid carrier may be admixed.

Gas oil, which is obtained by fractionation of the liquid hydrocarbon products, may be introduced into the vessel 6. Uniform distribution of the catalyst throughout the suspension is maintained by continuous agitation of the suspension in the vessel 6.

Catalyst suspension which is continuously prepared in this fashion passes through the conduit 8 into an exchanger 7 in which the temperature of the suspension is adjusted to the desired level which lies in the range of 150 to 400° F. From the exchanger 7, recycled suspension is introduced through the pipe 9 into the compressor 10 in which it is pressurized. Pressurized recycled suspension flows through the pipe 11 into the distributor 5 through which it is atomized into the reactor 4 by means of the entering stream of gaseous reactants.

The gaseous and vaporous constituents of the effluent from the reactor 4 leave the vessel 24 through a pipe 32 which leads to a cooler 39. In the cooler 39, condensation of the normally liquid constituents of the effluent is effected. After treatment in the exchanger 39, the effluent passes into a separator 41 in which the normally gaseous components are separated from the condensed normally liquid components.

The gaseous components comprising carbon monoxide, hydrogen, carbon dioxide, normally gaseous hydrocarbons and nitrogen leave the separator 41 through a pipe 42. In order to prevent accumulation of nitrogen in the system, a portion of this gas stream is discharged through a vent 43. This discharged gaseous fraction may be used as a fuel to supply heat to the reaction system wherever needed. The unvented portion proceeds along the pipe 42 and is returned therethrough to the pipe 1 through which the fresh feed of synthesis gas is flowing. In the pipe 1, recycle gas stream combines with fresh synthesis gas to form the total reactor feed which is delivered to the reactor 4 through the distributor 5. A recycle ratio of about one mol of recycle gas to one mol of fresh feed has proven to be advantageous. However, the recycle ratio expressed as mols of recycle gas to mols of fresh feed may vary from about 0.5:1 to 10:1.

The condensed products leave the separator 41 through a pipe 46 and are introduced into a decanter 47. In the decanter 47 water is separated from the hydrocarbon phase. Water is withdrawn from the decanter 47 through a pipe 48.

Liquid hydrocarbons flow from the decanter 47 through a pipe 49 into a fractionating column 50. In the fractionating column 50, liquid hydrocarbons are divided into component fractions. A gasoline fraction is taken off overhead through a pipe 51. A gas oil cut is withdrawn from the side of the column 50 through a pipe 52. Heavier hydrocarbon components are withdrawn from the column 50 through a drawoff pipe 53. These various fractions may then be piped to storage, not shown.

A portion of the gas oil fraction obtained from the fractionating column 50 through the pipes 52 is used as a liquid carrier for the catalyst suspension. A portion of this gas oil fraction is diverted from the pipe 52 through a pipe 55 which leads to the vessel 6 in which the suspension is prepared.

A preferred modification of the invention has been described in which concurrent flow of catalyst particles in gaseous reactants is employed. As stated previously, countercurrent flow of gaseous reactants and atomized catalyst particles is included within the concept of the invention. If this type of operation is employed, catalyst particles are continuously withdrawn from the lower portion of the reactor and then combined with gas oil to reform suspension which is recycled to the reactor in an atomized state. In this type of operation, advantage is not taken, however, of the atomizing ability of the gaseous reactants.

Obviously many modifications and variations of the invention, as hereinbefore set forth, may be made without departing from the spirit and scope thereof and, therefore, only such limitations should be imposed as are indicated in the appended claims.

I claim:

1. In the synthesis of organic compounds wherein a synthesis gas comprising hydrogen and carbon monoxide is contacted with a hydrocarbon synthesis catalyst at an elevated temperature at which the catalyst is effective to convert the reactants into desired synthesis products, the improvement which comprises atomizing into said synthesis gas reactant stream a liquid carrier material carrying suspended therein the hydrocarbon synthesis catalyst in the form of finely divided solid particles to form a fog of minute, finely divided droplets with the reactant gas mixture, passing said intimately intermingled mixture of synthesis gas and fog droplets through a reaction zone maintained under temperature and pressure conditions effective for substantial conversion of said synthesis gas into said desired products of reaction, said passage of the fog through the reaction zone being effected without vaporization of more than a portion of said carrier liquid such that all of the finely divided catalyst particles remain suspended in, and are delivered to the outlet of the reaction zone in the unvaporized liquid particles of said fog and withdrawing said effluent products of reaction containing the entrained fog droplets of unvaporized carrier liquid with the catalyst particles suspended therein.

2. The method according to claim 1 wherein the catalyst is separated from the withdrawn reaction zone effluent by coalescing the droplets of said fog.

3. The method according to claim 1 wherein the unvaporized liquid particles are separated by coalescing the droplets of fog with a scrubbing liquid.

4. The method according to claim 1 wherein said carrier liquid comprises a hydrocarbon fraction having a boiling point substantially above the temperature of said reaction zone.

5. In the catalytic synthesis of hydrocarbons, oxygenated hydrocarbons and mixtures thereof wherein a synthesis gas comprising hydrogen and carbon monoxide is subjected to the influence of a solid particle hydrocarbon synthesis catalyst in a reaction zone under reaction conditions including an elevated temperature and pressure at which said synthesis gas is converted into said desired products of reaction, the improvement which comprises forming a suspension of finely ground hydrocarbon synthesis catalyst in a suspending liquid, a substantial portion, at least, of which remains unvaporized under said reaction conditions, atomizing said liquid suspension into said reactant stream of synthesis gas to form a fog comprising minute, finely divided droplets of said liquid intimately dispersed in the reactant gas phase, passing said intimate fog mixture of catalytic droplets and reactant gas through said reaction zone under said reaction conditions to effect substantial conversion of said reactants into desired products of reaction without vaporization of more than a minor portion of said liquid, withdrawing from said reaction zone the effluent gasiform products of reaction containing said droplets of liquid suspension and separating the catalyst containing liquid droplets from the effluent products of reaction.

6. The method according to claim 5 wherein a major portion at least of the suspending liquid comprises fractions which remain unvaporized under said reaction conditions.

7. The method according to claim 5 wherein said suspending liquid comprises a liquid hydrocarbon.

8. The method according to claim 5 wherein said suspending liquid comprises a product fraction oil having a boiling point above the temperature of said reaction zone.

9. The method according to claim 5 wherein said droplets of suspending liquid containing catalyst are separated from the withdrawn reaction zone effluent by coalescence of said droplets.

References Cited in the file of this patent

UNITED STATES PATENTS

| Number | Name | Date |
|---|---|---|
| 2,159,077 | Duftschmid et al. | May 23, 1939 |
| 2,161,974 | Peck | June 23, 1939 |
| 2,405,386 | Wolk | Aug. 6, 1946 |
| 2,406,851 | Redcay | Sept. 3, 1946 |
| 2,433,072 | Stewart et al. | Dec. 23, 1947 |
| 2,473,129 | Atwell | June 14, 1949 |

OTHER REFERENCES

Hackh "Chemical Dictionary," 3rd ed. (1944), page 349.